United States Patent
Wanstrath

(10) Patent No.: US 7,354,537 B2
(45) Date of Patent: Apr. 8, 2008

(54) LAMINATED GLASS REPAIR TOOL AND METHOD FOR REPAIRING LAMINATED GLASS

(75) Inventor: Kerry A. Wanstrath, Durango, CO (US)

(73) Assignee: Glass Technology, Inc., Durango, CO (US)

( * ) Notice: Subject to any disclaimer, the term of this patent is extended or adjusted under 35 U.S.C. 154(b) by 124 days.

(21) Appl. No.: 11/105,556

(22) Filed: Apr. 14, 2005

(65) Prior Publication Data

US 2005/0238743 A1    Oct. 27, 2005

Related U.S. Application Data

(60) Provisional application No. 60/561,908, filed on Apr. 14, 2004.

(51) Int. Cl.
*B32B 43/00* (2006.01)
*B29C 73/00* (2006.01)

(52) U.S. Cl. .......................... 264/36.21; 425/12; 425/13

(58) Field of Classification Search ................ 425/11, 425/12, 13; 264/36.1, 36.21
See application file for complete search history.

(56) References Cited

U.S. PATENT DOCUMENTS 3,562,366 A * 2/1971 Sohl ........................ 264/443
4,280,861 A * 7/1981 Schwartz .................... 156/382
4,776,780 A * 10/1988 Banks ......................... 425/12
4,814,185 A * 3/1989 Jones ........................... 425/12
4,826,413 A * 5/1989 Matles ......................... 425/12
4,840,551 A * 6/1989 Lay et al. ..................... 425/12
5,069,836 A * 12/1991 Werner et al. ............ 264/36.21
6,485,281 B1   11/2002 Curl ........................ 414/745.1
6,663,371 B2   12/2003 Curl ............................ 425/12
2003/0205831 A1 * 11/2003 Rawlins et al. .......... 264/36.21

FOREIGN PATENT DOCUMENTS

JP        10-120984        5/1998

* cited by examiner

*Primary Examiner*—Yogendra N. Gupta
*Assistant Examiner*—Emmanuel S Luk
(74) *Attorney, Agent, or Firm*—Antonelli, Terry, Stout & Kraus, LLP.

(57) ABSTRACT

A laminated glass repair tool includes an injector body having a passage for applying a vacuum to a damaged area; a side chamber connected to the passage; and a resin reservoir movable within the side chamber between a first position in which resin provided in the resin reservoir is prevented from entering the passage in the injector body and a second position in which resin is allowed to flow into the passage in the injector body. A method for repairing laminated glass includes sealing the injector body to a damaged area of laminated glass; providing the filled resin reservoir in the side chamber; applying a vacuum to the damaged area of laminated glass through the passage while maintaining the resin reservoir in the first position; and moving the resin reservoir to the second position in to allow the resin to flow into the passage in the injector body.

22 Claims, 4 Drawing Sheets

LAMINATED GLASS REPAIR TOOL AND METHOD FOR REPAIRING LAMINATED GLASS

CROSS-REFERENCE TO RELATED APPLICATION

This application claims benefit, under 35 US.C 119(e), of the filing dated of prior provisional application Ser. No. 60/561,908, filed Apr. 14, 2004, the contents of which are incorporated herein by reference.

BACKGROUND OF THE INVENTION

The present invention relates to an improved device for the repair of damaged, e.g., stone damaged laminated glass, e.g., automotive windshield glass.

Windshield repair can be accomplished in several different ways. Most of which involve the use of an apparatus or bridge device that uses one or more suction cups to attach the device to the windshield during the repair process.

A device commonly referred to as an injector is used to inject, under pressure, a clear liquid resin into a damaged laminated windshield. Some injectors or apparatuses incorporate the use of vacuum to remove trapped air from within the many cracks and fissures of the damaged glass. Various devices are used to evacuate air from within the damaged laminated glass, such as syringes, vacuum pumps, and pneumatic hand pumps.

Typically an apparatus is placed over the damaged glass and clear liquid resin is placed into an injector type device, which is held directly over the damaged glass. A seal is employed at the end of the injector body using an o-ring or similar type seal to prevent any repair liquid leakage during both pressure and vacuum cycles. Typically the vacuum is created above the repair liquid, this low-pressure area allows air to travel thru the liquid and eventually to be vacuumed out of the injector body.

Once the repair liquid material comes into contact with the glass damage it will immediately begin to penetrate into the cracks and fissures of the damaged glass. This influence can adversely affect the vacuum's ability to remove all the trapped air and can slow the effects of the vacuum process. Depending on the viscosity and density of the repair liquid, this influence can be dramatic.

DESCRIPTION OF THE INVENTION

Figure 1:
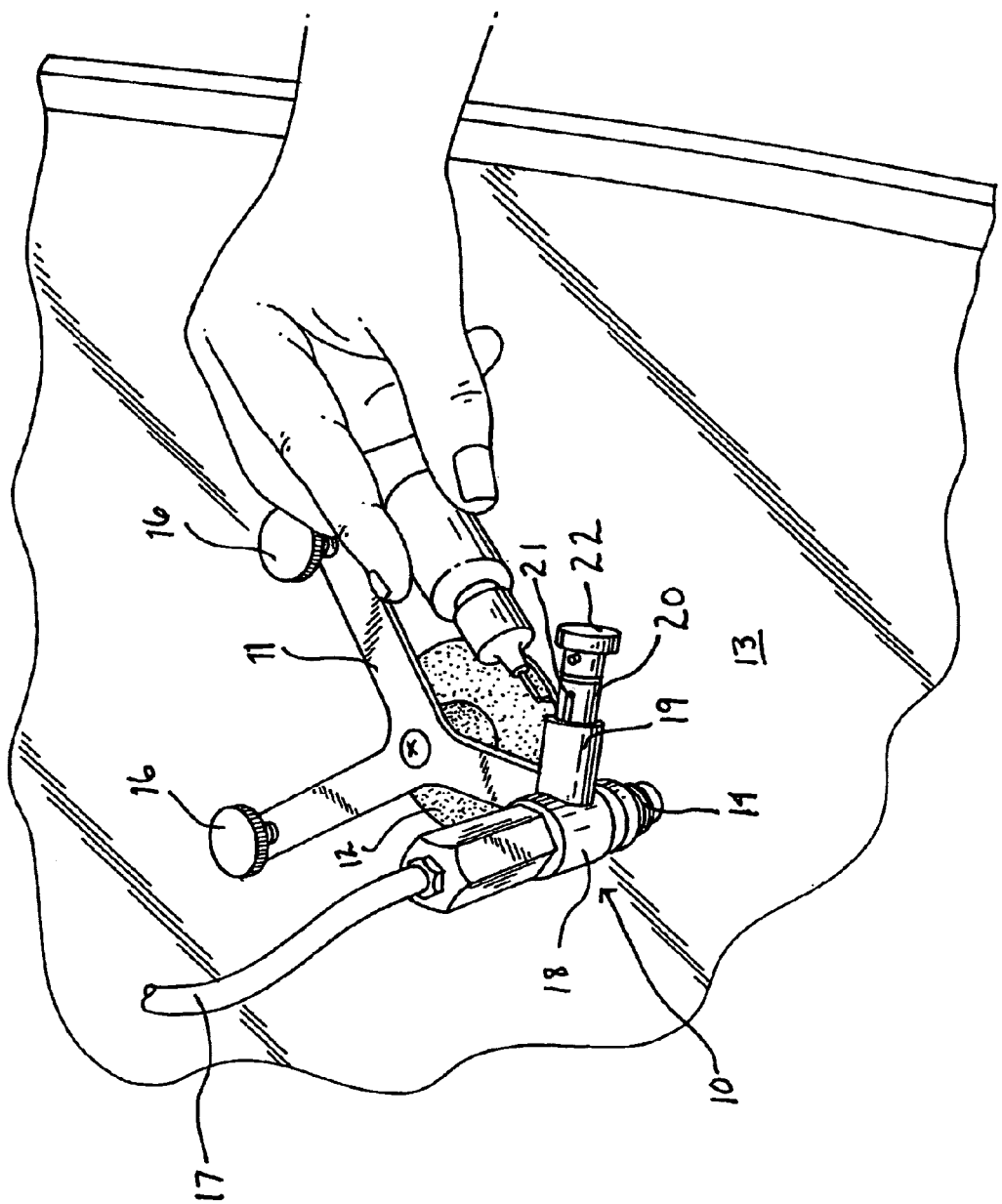
FIG. 1 is a perspective view of the device of the present invention being used.
Figure 2:
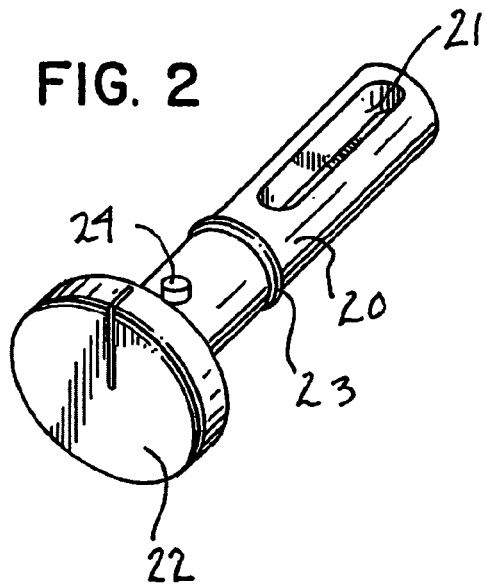
FIG. 2 is a perspective view of the resin reservoir of the device of the present invention.

FIG. 1 is a perspective view of the device (generally designated by the reference numeral 10) of the present invention being used. The device 10 is shown attached to a bridge device 11 that uses one or more suction cups 12 to attach the device 10 to the windshield 13 during the repair process, in a manner known in the art. The device 10 can be moved vertically in the bridge device 11 by using a screw thread on the outer circumference of the device 10 which mates with a corresponding screw thread 15 in one arm the bridge 11. The height of the other arms of the bridge 11 with respect to the windshield 13 can be adjusted by adjustment mechanisms 16 as is known in the art.

Various devices can be used to evacuate air from within the damaged laminated glass 13, such as syringes, vacuum pumps, and pneumatic hand pumps. FIG. 1 shows the device connected to, e.g., an air line used to supply vacuum and/or pressure 17.

The device 10 of the present invention includes and injector body 18 and a side chamber 19 into which a resin reservoir body 20 is inserted. The resin reservoir body 20 is shown in more detail in FIG. 3. The resin reservoir body 20 includes a slot 21 into which the resin can be provided, a handle 22, a seal 23 and pin 24, the functions of which are described hereinafter.

Figure 3:
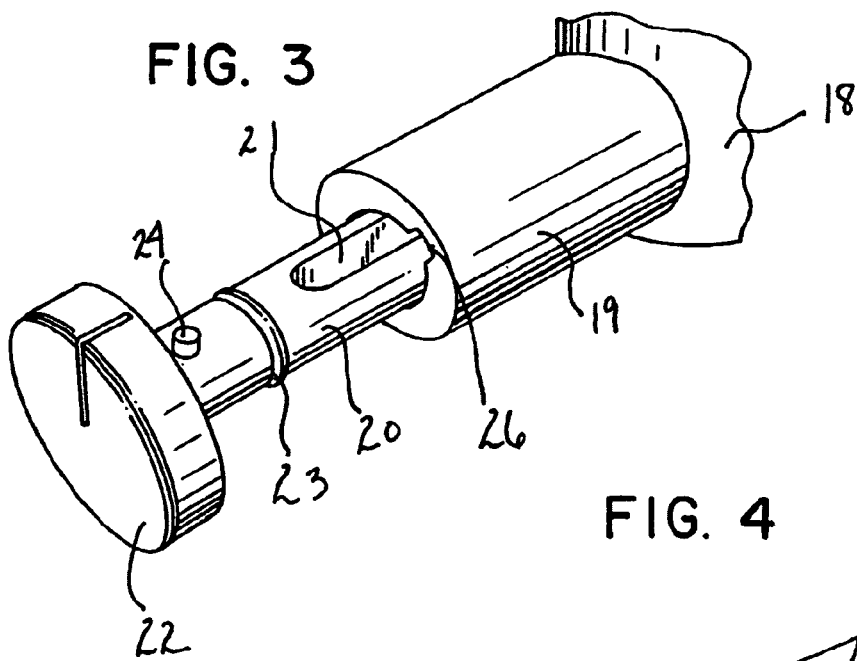
FIG. 3 is a perspective view of the resin reservoir partially inserted into the side chamber of the device of the present invention.
Figure 5:
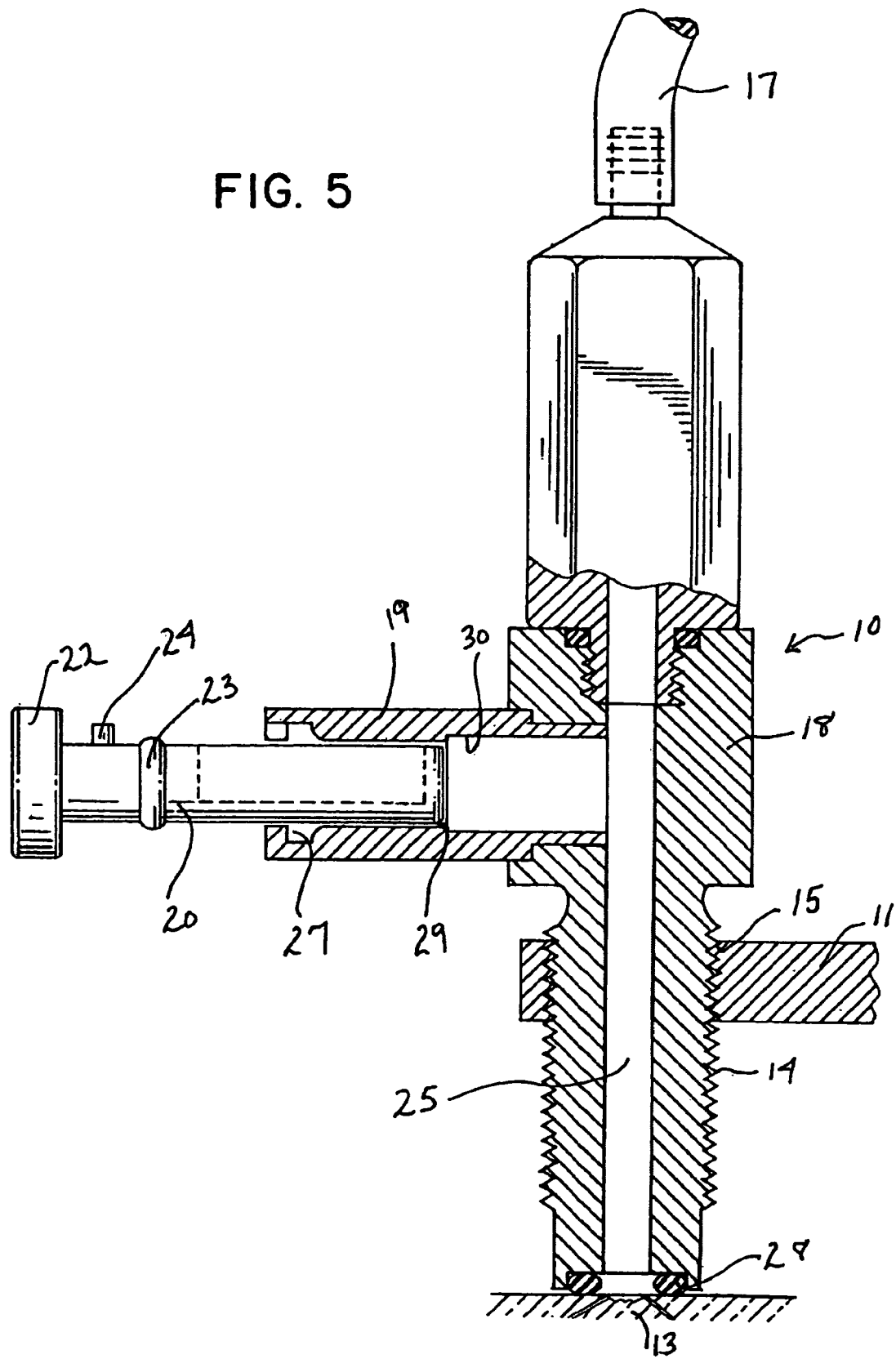
FIG. 5 is a cross-sectional view of the device of the present invention with the resin reservoir partially inserted into the side chamber.

The liquid repair resin can be provided in the slot 21 of the resin reservoir body 20 while it is partially inserted into the side chamber 19, i.e., in the position shown in FIGS. 1, 3 and 5. The resin is held at a perpendicular angle to the glass surface and at a distance great enough to ensure no liquid can inadvertently enter into the actual repair damaged area. The side chamber 19 is attached to the injector body 18 at an end of the injector body 18 opposite the end of the injector body 18 that comes into contact with the glass damage. The arrangement of the side chamber 19 and the resin reservoir body 20 ensures no liquid resin will contact the glass damage until the operator so desires. The side chamber 19 is located away from the damaged glass at the top of the injector body 18 at a perpendicular angle to the injector body. This location and perpendicular angle of the side chamber 19 ensures the liquid can be held in suspension away from the glass damage during the initial vacuum cycle.

Figure 4:
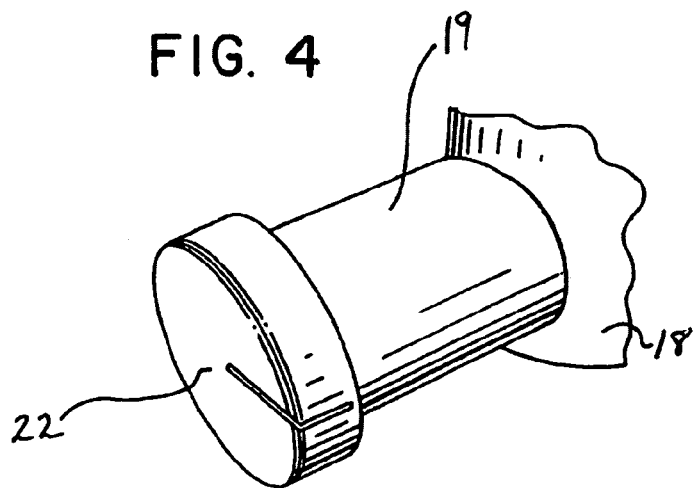
FIG. 4 is a perspective view of the resin reservoir fully inserted into the side chamber of the device of the present invention.
Figure 6:
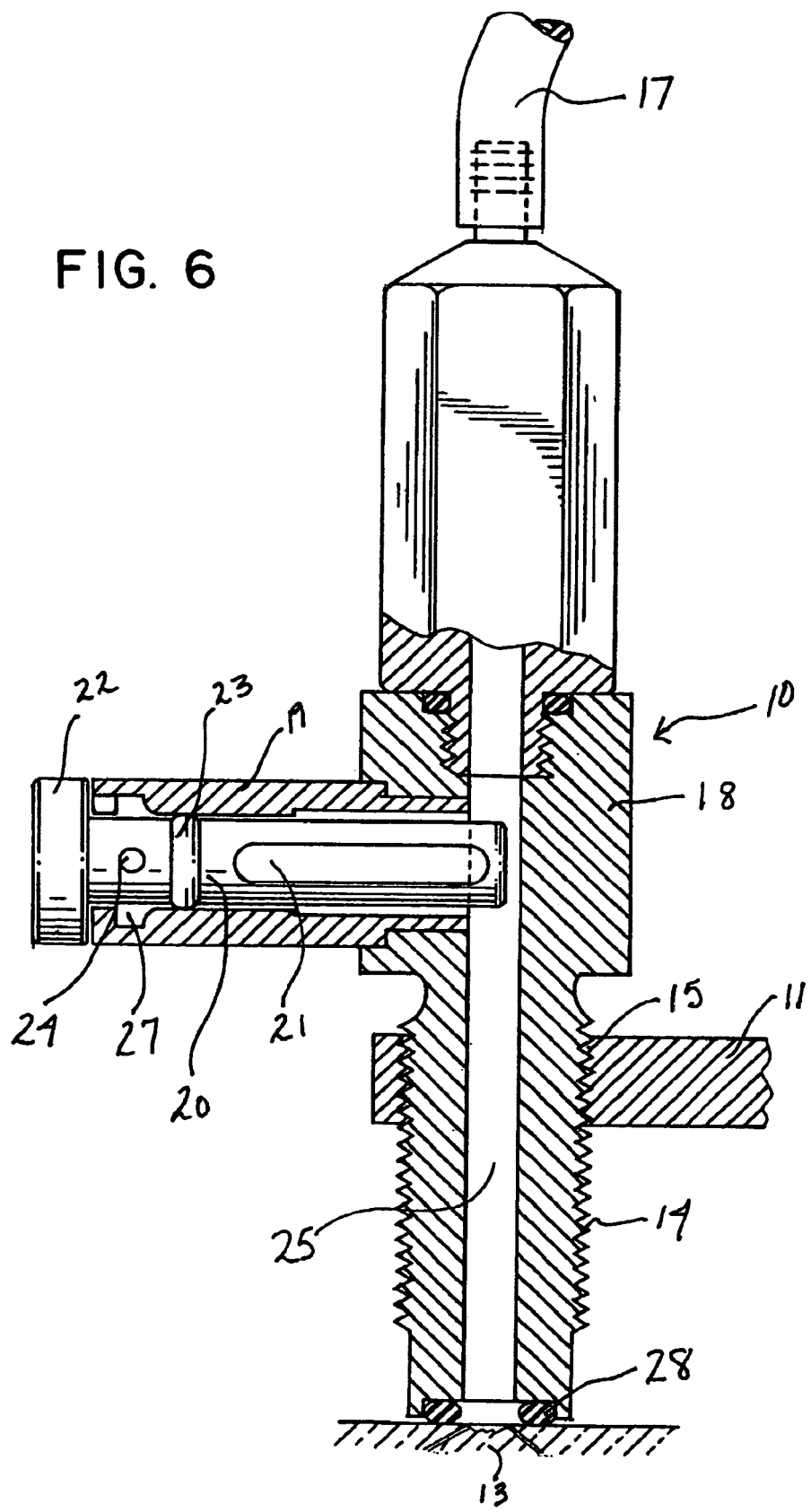
FIG. 6 is a cross-sectional view of the device of the present invention with the resin reservoir fully inserted into the side chamber.

While the resin reservoir body 20 is partially withdrawn from the side chamber 18 (in the position shown in FIGS. 1, 3 and 5), a clear liquid resin is dispensed into a slot 21. A seal 23 is attached to the resin reservoir body 20 to create a positive seal against the interior wall of the side chamber 19 when the resin reservoir body 20 is slid into the side chamber 19, as shown in FIGS. 4 and 6. This seal 23 performs two functions, one to allow for the creation of vacuum and pressure, and two to prevent any potential leakage on the repair liquid outside of the side chamber 19. The injector body 18 is positioned so the side chamber 19 is horizontal during the first vacuum cycle.

Positioning it horizontally prevents any liquid resin material from running into the interior of the injector body 18 and onto the glass damage area being repaired.

Once the liquid resin is placed into the slot 21 of the resin reservoir body 20 and it is slid into the side chamber 19 by aligning pin 24 with the groove 26 in the side chamber 19 (see, e.g., FIG. 3), a vacuum can be drawn using several different devices. Using a quick disconnect, a connection is made through air line 17 to the top of the injector body to a vacuum and pressure source. These devices can be but are not limited to a mechanical pump, hand pump, or a syringe. A connection is made at the top most end of the injector body 18, the injector body is sealed against the glass repair area 13 by, e.g., o-ring 28, and a vacuum is created.

A vacuum is now administered through passage 25 of injector body 18 to remove air from the many fissures in the damaged glass 13. Removing the air before any possibility of liquid repair material entering the damaged area allows for a faster more direct transfer of air unimpeded by the adverse influence of a viscous liquid resin. Now a direct air-to-air transfer can take place without the influences of a liquid covering the damage. The side chamber 19 and resin reservoir body 20 allow the operator to maintain a vacuum until such time as the operator sees fit to release the repair liquid.

Once an initial vacuum cycle has been completed, typically taking around two minutes, the resin reservoir body 20 is rotated 180 degrees by turning handle 22 to release the liquid resin contained in the resin reservoir slot 21. The pin 24 located on the shaft of the resin reservoir body 20 slides in circumferential groove 27 that allows for a 180-degree turn of the resin reservoir body 20. The resin reservoir body 20 is shown turned partially through the 180 degrees in FIG. 6. The vacuum is maintained during this release of liquid resin. Rotating the side chamber 19 slightly vertically by turning the device 10 in the bridge 111 at this time can help the flow of the resin downward the bottom of the injector body 18 to cover the glass damage repair area 13.

The repair area 13 now being completely covered with the liquid resin, a pressure cycle can be initiated. This pressure cycle will force the liquid material into the remaining unfilled cracks and fissures. A 12-volt reciprocating pump is preferably used to supply the pressure and vacuum necessary to complete the repair. However many devices can accomplish this task such as a hand pump or syringe type device. After an adequate time, the pressure cycle is released and a new vacuum cycle is formed to remove any air not removed in the initial vacuum cycle. At the operator's discretion, additional alternating vacuum and pressure cycles can be deployed. After the operator is satisfied the repair area is free of air and all the glass fractures are filled, the bridge assembly 11 shown in FIG. 1 is removed from the glass. A thick resin or pit filler is applied to the damage area and cured using an ultraviolet lamp.

The locking pin 24 and groove 27 are used as a mechanism to prevent the resin reservoir body 20 from being pushed out of the side chamber 19 during a pressure cycle. The slot 27 within the side chamber 19 to receive the locking pin 24 preferably allows for a complete 360 degree rotation of the resin reservoir body 20. The side chamber 19 preferably has an inner cylinder wall that is relieved so as to allow for the free flow of liquid resin during a vacuum cycle, as shown, e.g., in FIG. 5. The interior wall has two diameters, one at portion 29 that is a close tolerance that seals with the o-ring 23 on the resin reservoir body 20, and the other portion 30 having a larger diameter that allows the resin to flow out of the side chamber 19 and into the passage 25 in the injector body 18.

What is claimed is:

1. A laminated glass repair tool comprising:
an injector body having a passage for applying a vacuum to a damaged area of laminated glass;
a side chamber connected to the passage in the injector body; and
a resin reservoir movable within the side chamber between a first position in which resin provided in the resin reservoir is prevented from entering the passage in the injector body and a second position within the side chamber offset from the first position in which resin is released and allowed to flow by gravity into the passage in the injector body.

2. The laminated glass repair tool according to claim 1, wherein the resin reservoir comprises a resin reservoir body having a slot therein in which resin can be provided.

3. The laminated glass repair tool according to claim 2, further comprising means for sealing the resin reservoir body in the side chamber.

4. The laminated glass repair tool according to claim 2, wherein the resin reservoir body can be rotated in the side chamber between the first position in which the slot laces upward and the second position in which the resin is allowed to flow into the passage in the injector body by gravity.

5. The laminated glass repair tool according to claim 1, wherein a longitudinal axis of the side chamber is perpendicular to a longitudinal axis of the injector body.

6. The laminated glass repair tool according to claim 1, further comprising a seal provided between an exterior surface of the resin reservoir and an interior wall of the side chamber for sealing the resin reservoir in the side chamber.

7. The laminated glass repair tool according to claim 1, further comprising a syringe for evacuating air from within the damaged area of laminated glass though the passage in the injector body.

8. The laminated glass repair tool according to claim 1, further comprising a pneumatic hand pump for evacuating air from within the damaged area of laminated glass through the passage in the injector body.

9. The laminated glass repair tool according to claim 1, further comprising a hand pump for applying pressure to the damaged area through the passage in the injector body.

10. The laminated glass repair tool according to claim 1, further comprising a syringe for applying pressure to the damaged area through the passage in the injector body.

11. A laminated glass repair tool comprising:
an injector body having a passage for applying a vacuum to a damaged area of laminated glass;
a side chamber connected to the passage In the injector body;
a resin reservoir movable between a first position in which resin provided in the resin reservoir is prevented from entering the passage In the injector body and a second position in which resin is allowed to flow by gravity into the passage in the injector body;
a seal provided between an exterior surface of the resin reservoir and an interior wall of the side chamber for sealing the resin reservoir in the side chamber; and
a syringe or a pneumatic hand pump for applying a vacuum to the damaged area of laminated glass through the passage in the injector body while maintaining the resin reservoir within the side chamber in the first position in which the resin provided in the resin reservoir is prevented from entering the passage in the injector body.

12. A method for repairing laminated glass, comprising the steps of:
sealing an injector body having a passage therein to a damaged area of laminated glass;
filling a resin reservoir with resin and providing the resin reservoir in a side chamber connected to the passage in the injector body;
applying a vacuum to the damaged area of laminated glass through the passage in the injector body while maintaining the resin reservoir within the side chamber in a first position in which the resin provided in the resin reservoir is prevented from entering the passage in the injector body; and moving the resin reservoir within the side chamber to a second position within the side chamber offset from the first position and to release the liquid resin from the resin reservoir and allow the resin to flow by gravity into the passage in the injector body.

13. The method for repairing laminated glass according to claim 12, wherein the resin reservoir comprises a resin reservoir body having a slot therein in which resin can be provided.

14. The method for repairing laminated glass according to claim 13, wherein the step of moving the resin reservoir to a second position in which resin is allowed to flow into the passage in the injector body comprises rotating the resin reservoir body in the side chamber from the first position in which the slot faces upward to the second position in which the resin is allowed to flow into the passage in the injector body by gravity.

15. The method for repairing laminated glass according to claim 12, wherein a longitudinal axis of the side chamber is perpendicular to a longitudinal axis of the injector body.

16. The method for repairing laminated glass according to claim 12, wherein the step of providing the resin reservoir in the side chamber connected to the passage in the injector body includes sealing the resin reservoir in the side chamber by a seal provided between an exterior surface of the resin reservoir body and an interior wall of the side chamber.

17. The method for repairing laminated glass according to claim 12, wherein the step of applying a vacuum to the damaged area of laminated glass comprises evacuating air from within the damaged area of laminated glass through the passage in the injector body using a syringe or a pneumatic hand pump.

18. The method for repairing laminated glass according to claim 12, further comprising, after the damaged area is completely covered with the resin, applying pressure to the damaged area to force the resin into any remaining unfilled cracks or fissures in the damaged area.

19. The method for repairing laminated glass according to claim 18, wherein the step of applying pressure to the damaged area to force the resin into any remaining unfilled cracks or fissures In the damaged area is carded out using a hand pump or syringe.

20. A method for repairing laminated glass, comprising the steps of:
   sealing an injector body having a passage therein to a damaged area of laminated glass;
   filling a resin reservoir with resin;
   providing the resin reservoir in a side chamber connected to the passage in the injector body and sealing the resin reservoir in the side chamber by a seal provided between an exterior surface of the resin reservoir and an interior wall of the side chamber;
   applying a vacuum to the damaged area of laminated glass through the passage in the injector body using a syringe or a pneumatic hand pump while maintaining the resin reservoir within the side chamber in a first position in which the resin provided in the resin reservoir is prevented from entering the passage in the injector body; and
   moving the resin reservoir to a second position to release the resin from the resin reservoir and allow the resin to flow by gravity into the passage in the injector body.

21. The method for repairing laminated glass according to claim 20, further comprising, after the damaged area is completely covered with the resin, applying pressure to the damaged area to force the resin into any remaining unfilled cracks or fissures in the damaged area.

22. The method for repairing laminated glass according to claim 21, wherein the step of applying pressure to the damaged area to force the resin into any remaining unfilled cracks or fissures in the damaged area is carried out using a hand pump or syringe.

* * * * *